United States Patent [19]

Oppitz

[11] Patent Number: 4,678,554
[45] Date of Patent: Jul. 7, 1987

[54] METHOD AND INSTALLATION FOR GENERATING AN ELECTRICAL FIELD IN THE SOIL

[75] Inventor: Hans Oppitz, Mils, Austria

[73] Assignee: ELTAC Nogler & Daum KG, Innsbruck, Austria

[21] Appl. No.: 825,055

[22] Filed: Jan. 31, 1986

Related U.S. Application Data

[63] Continuation of Ser. No. 704,138, Feb. 21, 1985, abandoned, which is a continuation of Ser. No. 464,721, Feb. 7, 1983, abandoned.

[51] Int. Cl.[4] .......................... B01D 13/02; C25B 11/0
[52] U.S. Cl. .............................. 204/299 R; 204/180.1; 204/182.3; 204/290 R; 210/748
[58] Field of Search ............ 204/229 R, 290 R, 182.3, 204/180.1; 210/748

[56] References Cited

U.S. PATENT DOCUMENTS

| | | | |
|---|---|---|---|
| 1,715,970 | 6/1929 | Williams | 204/182.2 X |
| 2,831,804 | 4/1958 | Collopy | 47/1.3 |
| 3,915,826 | 10/1975 | Franceschini | 204/182.2 |
| 4,500,410 | 2/1985 | Oppitz | 204/229 R |

FOREIGN PATENT DOCUMENTS 693414 11/1930 France .
2403424 4/1979 France .

Primary Examiner—Arthur P. Demers
Attorney, Agent, or Firm—Kurt Kelman

[57] ABSTRACT

The invention provides an installation and method for generating an electrical field of a large area in soil having a vegetation zone between the ends of roots of plants in the soil and the surface of the soil, which comprises at least one cathode having a high conductivity and a low transition resistance arranged in the vegetation zone, each one of the cathodes being a flexible net comprised of threads defining meshes of a sufficient size to accommodate the plants therein, the threads of the net being comprised of at least one core material selected from the group consisting of polyamide, acrylic resin, polyester, and carbon and metal filaments embedded in an electrically conductive synthetic resin, an anode arranged in a deeper zone of the soil at a greater distance from the soil surface than each one of the cathodes, and an electrical conductor system connecting each one of the cathodes to the anode to enable an electric current to flow therebetween.

16 Claims, 6 Drawing Figures

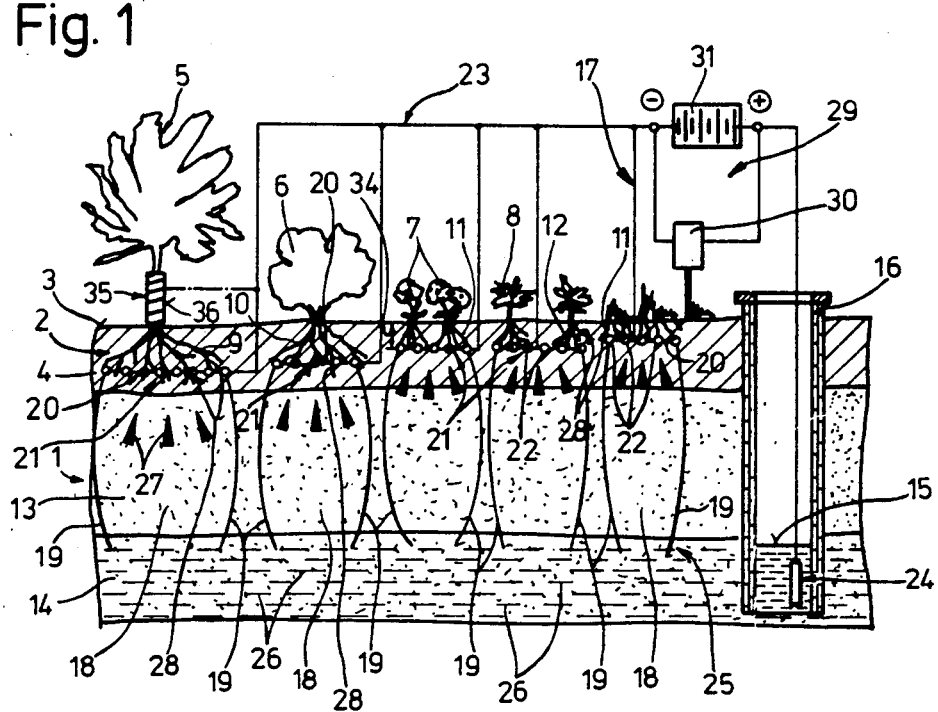
Fig. 1
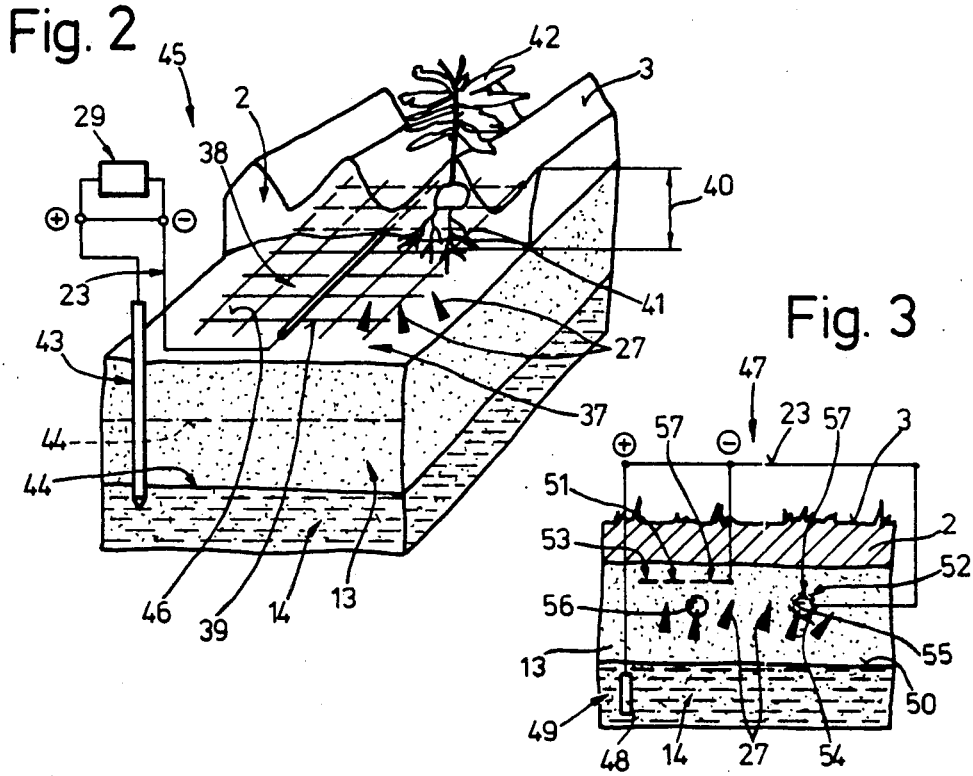
Fig. 2
Fig. 3

METHOD AND INSTALLATION FOR GENERATING AN ELECTRICAL FIELD IN THE SOIL

This is a continuation of U.S. application Ser. No. 704,138, filed Feb. 21, 1985, now abandoned which is a continuation of U.S. application Ser. No. 464,721, filed Feb. 7, 1983, now abandoned.

The invention relates to a method and an installation for generating an electrical field in the soil with two spaced electrodes disposed below the surface of the soil and connected by a conductor system, preferably including a source of electrical energy.

It has been proposed in German patent No. 2,503,670 to generate an electrical field in the soil by disposing electrodes in the soil to effectuate a targeted movement of the ground water, for example when the natural water table is too low or when the capillary effect of the soil is too poor.

U.S. Pat. No. 1,715,970 discloses a method of hydrating crops in semi-arid zones by producing an electrical field between a transmitting and receiving electrode in the soil. For this purpose, it is proposed to drive one or more qonducting rods of iron, for example, into the ground or lay metallic wires in one or more deep plough furrows to serve as the cathode. Large-area conducting plates are buried in the water table to serve as anode. No exact spatial disposition of the electrodes is disclosed.

French patent Nos. 693,414 and 2,403,424 propose the use of metallic wire nets as electrodes for similar purposes It has also been proposed to use electrodes of polytetrafluor ethylene (PTFE) filled with conductive, corrosion-resistant and electrolyte-resistant materials. These filling materials may be carbon, for example synthetic coal, graphite or carbon black.

The object of the present invention is to find an effective and practical way to generate a homogenous electrical field of large area in soil and which, furthermore, may be set up in active as well as passive operation (with or without outside current supply).

The above object is accomplished according to one aspect of this invention with an installation forgenerating an electrical field of a large area in soil having a vegetation zone between the ends of roots of plants in the soil and the surface of the soil, which comprises at least one cathode of high conductivity and a low transition resistance arranged in the vegetation zone, an anode arranged in a deeper zone of the soil at a greater distance from the soil surface than each cathode, and an electrical conductor system connecting each cathode to the anode to enable an electric current to flow therebetween. Each cathode is a flexible net comprised of threads defining meshes of a sufficientsize to accommodate the plants therein, the threads of the net being comprised of at least one core material selected from the group consisting of polyamide, acrylic resin, polyester, carbon filaments and metal filaments embedded in an electrically conductive synthetic resin.

According to another aspect of the invention, a method for increasing the moisture in a vegetation zone of soil between the ends of roots of plants in the soil and the surface of the soil is provided, wherein at least one of the above-described cathodes is electrically connected to a electrode arranged in a deeper aquifer zone of the soil at a greater distance from the soil surface, the electrode contacting the soil in the aquifer zone through the moisture therein and forming an anode therewith, to cause an electric current to flow therebetween whereby the moisture content is increased in the vegetation zone by causing water from the aquifer zone to be displaced in the direction of the cathode as a result of electroosmosis.

In this manner, water may be brought by electroosmosis from the deeper soil regions into the range of the roots of plants, trees or bushes and the like in a region of the soil adjacent the soil surface. At the same time, this causes undesired metals or salts to be removed from the region of the plant roots, which appear in the ground water in connection with the electrophoresis and electrolysis occurring during electroosmosis, by depositing them either in the region of the anode or precipitating the metals on the cathode and bonding them thereto. Furthermore, an installation of the type provided by the invention is relatively simple and economical to erect and can be universally used for watering, obtaining water and purifying water.

An enhanced removal of salts from the vegetation zone of the soil may be used for preparing new plants or rehabilitating existing vegetation or to increase the moisture content in the range of the roots without leaving the soil surface moist by arranging an electrode in the vegetation zone of the soil at a selected pole, that is by using it as an anode or cathode, because the installation according to the invention enables the moisture to sink in the soil surface to the range of the electrode so that the soil surface remains dry and undesired flora, especially moss formation, or fauna, particularly snails crawling over the plants, is avoided The above and other objects, advantges and features of the present invention will become more apparent from the following detailed description of certain now preferred embodiments thereof, taken in conjunction with the accompanying drawing wherein FIG. 1 is an end view, partly in section, of one embodiment of an installation according to this invention;

FIG. 2 is a fragmentary perspective view of another embodiment of the installation;

FIG. 3 is a view similar to that of FIG. 1 and showing another embodiment of the installation for winning water out of the soil in arid areas;

Figure 4:
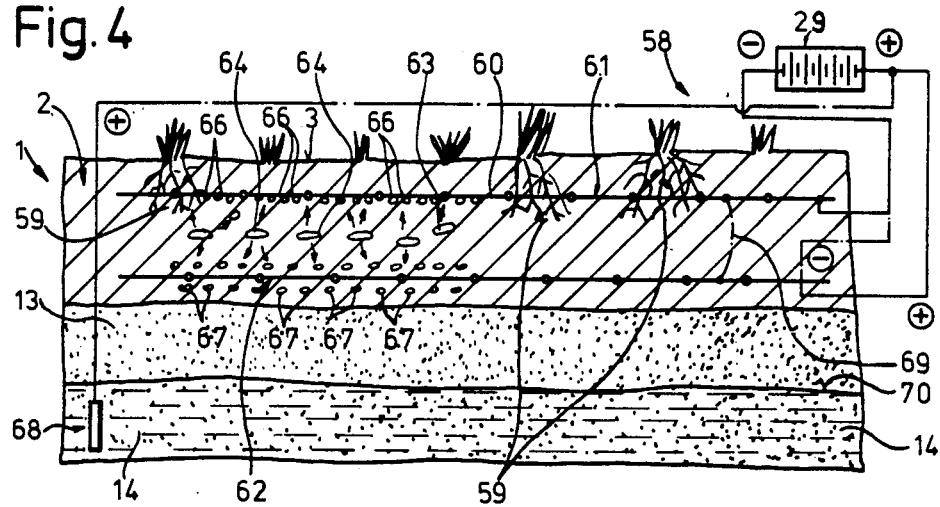
FIG. 4 is a like view of still another embodiment.

Referring now to the drawing and first to FIG. 1, there is shown a section through different layers of soil 1. Humus 4 is provided in zone of vegetation 2 below surface 3. Trees 5, bushes 6, flowers 7 as well as vegetable plants 8 obtain their nutrients through roots 9 to 12. A ground region 13 of sandy and very water-permeable material is present below zone of vegetation 2 and therebelow an aquifer zone 14. The height of the aquifer layer may be seen from water level 15 in well 16. To prevent the surface water from sinking immediately through sandy ground region 13 below zone of vegetation 2 and to make it possible for the liquid stored in zone 14 to moisten roots 9 to 12 in zone of vegetation 2, installation 17 for generating electrical field 18 is provided, as schematically illustrated by electrical field lines 19. This installation 17 comprises several electrodes 21 used as cathodes 20 each of which is constituted by a net of several closely adjacent and parallel distribution lines 22. Individual cathodes 20 form a circuit with conductor system 23 which connects cathodes 20 with electrode 24 connected to the positive potential and arranged below water level 15. If electrode 24 has a high conductivity and a low transition resistance, a good contact with the liquid stored in zone 14 is assured. In this manner, the entire liquid in this zone is charged with the positive potential and constitutes anode 25. If anode 25 is connected by conductor system 23 to cathodes 20, a potential difference is built up because of the different pH-values in zone of vegetation 2 and aquifer zone 14, due to the enrichment of salts in the liquid. This difference in the potential leads to the generation of electrical fields 18 which are schematically shown between individual cathodes 20 and anode 25 by field lines 19. The generation of these electrical fields 18 produces an electroosmotic effect which causes water 26 to flow from zone 14 in the direction of the negative pole, i.e. cathodes 20. This water flow due to the different polarities has been indicated by arrows 27.

Because cathodes 20 comprise several parallel but closely adjacent distribution lines 22, wide and strong electrical fields 18 with low current intensities are created so that damage to root ends 28 of roots 9 to 12 as well as to microorganisms in zone of vegetation 2 is avoided.

In this manner, several planar, immediately adjacent electrical fields are generated so that an increased water flow from the lower, aquifer soil layers into the zone of vegetation of the soil is obtained. This enables the moisture to be increased also in the soil regions between the electrodes.

To hold the effect of the electroosmosis and the force of electrical fields 18 at a constant and predetermined value, it is possible to include a source of energy 29 in the circuit. This source of energy consists in the illustrated embodiment of a solar cell 30 and an energy storage device, for example battery 31 which may optionally be provided for a battery operation at night. Frequently, however, solar cell 30 is enough since trees 5, bushes 6, flowers 7 and vegetable plants 8 in flower beds 32 and vegetable beds 33 require a lot of liquid only when the sun shines. At that time, outside energy is supplied to electrodes 21, 24, i.e. cathode 20 and anode 25, by solar energy cell 30 so that a forced water flow in the direction of arrows 27, that is, to roots 9 to 12, is provided.

But at the same time, the arrangement of cathodes 20 prevents the surface water from sinking too fast into ground region 13 after precipitation since cathodes 20 form a horizontal barrier with anode 25, which prevents a water flow in a direction opposite to that of arrows 27. In this manner, fertilizing agents placed in ground surface 3 are held in zone of vegetation 2 together with the moisture so that sufficient nutrients reach roots 9 to 12. This leads to a faster plant growth as well as to higher yields and makes it possible to reduce watering the surface of the ground.

It has been found that an arrangement of cathodes 20 at a distance 34 of about 20 to 40 cm below ground surface 3 makes it possible to keep the soil at ground surface 3 dry in flower and vegetable beds 32 and 33, and assures a sufficient water flow to the region of roots 11 and 12. It is preferred, in this arrangement, to supply a voltage of 6 Volts from energy source 29 between anode 25 and cathodes 20 and to feed a current of about 50 mA. Fields generated thereby are sufficient to effect an adequate electroosmotic water flow from aquifer zone 14 to zone of vegetation 2. This results in a sufficient water flow from the deeper aquifer soil layers into the zone of vegetation. At the same time, backwash of the surface water to keep the soil surface moist is prevented, which avoids damaging conditions, such as proliferation of snails and formation of moss. Furthermore, the nutrients for the plants are kept in the region of the roots since they cannot sink below the electrode.

It is also within the scope of the invention to arrange the cathode at a distance below the surface of the soil so that the intermediately positioned regions of the soil receive the moisture from the soil surface and conduct it away. This targeted arrangement of the cathode enables the installation of the invention to be adapted to different amounts of water conducted to the surface of the soil so that a soaking of the surface of the soil due to a backwash of the liquid above the electrode in the range of the installation of the invention is prevented in all cases.

A further advantage is obtained with the use of the installation of FIG. 1 according to the invention in a glass house erected with heat-absorbent glass. The heat retained by the high insulating effect of the heat-absorbent glass produces, of course, strong evaporation of the water conducted through ground surface 3 to the plants. This evaporation of water, in turn, produces cold requiring an increase in heating. But if the water required by the plants is no longer conducted through ground surface 3 but from lower zone 14 by the use of electroosmosis, the surface of the ground remains dry and the evaporation of water is reduced. Because of the considerably reduced humidity in glass houses, less heating energy is required and mushroom growth has been reduced.

As has also been schematically indicated in FIG. 1, an electrode 35 may be placed about the trunk of tree 5 to enhance the water flow. This electrode 35, which is connected as cathode 36, may be connected by a conductor to circuit 23. This will initiate the water flow not only into the region of roots 9 but also within the trunk and the yield, particularly of fruit trees, can be increased.

FIG. 2 shows an embodiment wherein electrode 37 constituting cathode 38 is a net 39. This net 39 is arranged at distance 40 below ground surface 3. Net 39 is in the range of roots 41 of plant 42 and assures that nutrients and moisture are retained in the range of roots 41 and ground surface 3 remains dry. Keeping the surface of the ground dry prevents the growth of harmful flora and fauna. To raise the water from aquifer zone of vegetation 2—arrow 27—, cathode 38 is connected by conductor system 23 to electrode 43, for instance an electrode of synthetic resin filled with carbon. It is important for such electrodes 43, particularly if they are connected to a positive potential, to have high conductivity and a low transition resistance. If these conditions are met, a good contact with the surrounding aquifer zone 14 is obtained so that the entire zone 14 operates as anode 44. Therefore, the electrical field is generated between zone 14 serving as anode 44 and net 39, producing a large extension of the area of the electrical field and a correspondingly strong field effect.

To operate such an installation 45, cathode 38 and anode 44 are connected by source of energy 29 which may be constituted by a battery or another current generator. This activates the potential difference naturally flowing from the pH-value differential between aquifer zone 14 and zone of vegetation 2. This potential difference is mostly the effect of the salts dissolved in the liquid in zone 14 as compared to zone of vegetation 2. If a strong electrical field is generated at the beginning of such an electroosmotic process by the supply of outside energy, moisture travels through ground region 13 in the direction of zone of vegetation 2 and, therefore, anode 44 is also displaced in the direction of ground surface 3, as indicated by broken lines. If the supply of outside voltage is then interrupted after the initial operating phase, a more intensive passive operation is possible because of the smaller distance between anode 44 and cathode 38 because an intensive field is generated by the potential differences between the water, which has a higher conductivity, and zone of vegetation 2, wherein current flows to effect an osmotic water flow in the direction of roots 41 of plants 42.

As can be seen, cathode 38 constituted by net 39 has the advantage that roots 41 of plants 42 may pass through meshes 46 of net 39. Therefore, the roots may spread out unhindered and, furthermore, heavy metal ions present in the ground are deposited on large-surface net 39. Accordingly, fine roots 41 are not damaged by the metal ions.

To adapt to the individual plants or trees and the like, the mesh size of net 39 may vary.

But the surprising advantage of the use of a net as cathode resides primarily in the generation of an electrical field of large area, wherein approximately the same electrical conditions prevail, so that a uniform water flow in the direction of arrows 27 is obtained without destroying roots due to excessive current intensities.

In garden and vegetable cultures, the use of the installation and of the method results in a reduction of watering, in amounts as well as in frequency, a reduction of fertilization, because the fertilizers are no longer leached so easily out of the zone of vegetation, as well as a lessening of the concentration of heavy metal in the ground because of the electrochemical precipitation of the corresponding ions on the negative electrode. The relatively coarse-mesh cathode net permits passage of the plant roots. The position of the laid net relative to the surface of the ground is also of great importance. If the depth of the position is favorable, the surface of the ground will remain practically dry. This prevents growth on the surface of undesired flora, especially moss. The proliferation on the ground surface of harmful fauna, such as snails, etc., is also reduced.

The tests described hereinafter constitute a few special examples of the invention.

Two electrodes constituted by nets having dimensions of 4.5×1 m were laid in two beds for cut flowers at a depth of 30 cm in a hot house of an urban garden of a Central European city. These nets consist of a synthetic resin carrier material which does not rot and is coated by a conductive material, they are flexible and have embedded therein one or more flat wire bands of phosphorous copper coated with silver as current conductor.

Two ground conductors on the hot house walls were used as anode.

Without outside voltage, the circuit connected by cables had a voltage of 0.6 Volts and a current intensity of 3.2 mA.

The current intensity rose to 101 mA when an outside voltage of 6 Volts was supplied.

The test was made with a 6-Volt voltage and showed that the beds required practically no more watering and fertilizing for about 6 months.

Even before the net was connected to the ground connections, a very positive influence of the nets could be noted. When the beds were watered after the nets had been laid, the beds with nets showed at least double the water retention compared to the beds without nets. The bed with the nets remained moist for a substantially longer time than those locations where no net was laid.

Furthermore, the following test was run on an Atlantic island:

A net electrode of the dimension 4.7×46 cm was laid at a depth of 24 cm in a flower garden with a soil which was relatively dry because of its high permeability and an annular water conduit was connected as ground. The electrical values were 0.6 Volts and 2.2 mA without outside voltage; at an outside voltage of 6 Volts, 22 mA after operation was started and 48 mA twenty-four hours later Here, too, it was shown that the strip of garden provided with the net required much less frequent watering. The flowers in this bed were still fresh after an extended absence of the owner while the same flowers at a distance of about 1 m from the net were considerably damaged by dryness.

An installation 47 for winning water and simultaneously supplying water to plants is shown in FIG. 3. This installation 47 comprises electrode 49 constituted by carbon rod 48 laid in lower aquifer zone 14 with which the moisture in zone 14 is connected to a positive potential so that the entire zone 14 operates as anode 50. Electrodes 51, 52 are arranged below soil surface 3. Electrode 51 is constituted by net 53. Electrode 52 is constituted by drainage pipe 55 coated by conductive synthetic resin 54. Drainage pipes 56 are also arranged below net 53. When electrodes 51, 52 used as cathodes 57 are connected with anode 50 by conductor system 23, an electrical field is generated between anode 50 and cathodes 57, current flows and, therefore, water is transported from aquifer zone 14 in the direction of drainage pipes 55 and 56, as has been indicated by arrows 27. The water rising in soil region 13 is partially caught in drainage pipes 55, 56. The remaining rising soil moisture is conducted to the root region of the plants in the region of soil surface 3 and zone of vegetation 2. Such an installation 47 was operated for test purposes on an Atlantic island in the following manner:

Two strips of nets 53, having respective dimensions 4 m×46 cm and 3 m×46 cm, were laid at a depth of 22 cm in a garden. The nets were connected to an iron pipe which was laid in a drainage pit. This produced 0.55 Volts and 4.1 mA without outside voltage; 24 mA were produced after the start of the operation, 41 mA after two hours and 56 mA six hours later when an outside voltage of 6 Volts was connected.

Here, too, the effects of the laid net were obvious; the cultures over these strips had to be watered less and made a generally fresh impression.

A drainage pipe of synthetic resin with a diameter of 5 cm was subsequently laid below a portion of the strip having a length of 3 m. The garden is about 15 m above sea level so that it may be assumed that at least a portion of the aquifer layers below the test area contain more water. Sea water, which was clear and left practically no salty aftertaste when drunk, was collected in the drainage pipe.

One of the reasons why the sea water collected in drainage pipes 55 and 56 left no salty aftertaste when drunk is the fact that electrophoresis causes particles with a negative charge to travel to anode 50. Since salts are composed of positively charged metal ions and negatively charged "salt residue", the particles of different charge are separated and the negatively charged particles, that is, the "salt residue", such as, for example, Cl, $No_3$ as well as $CH_3$, $Po_43$ as well as $HCo_3$, travel to anode 50 and are there deposited. Thus, the arrangement of drainage pipes between the cathode and the anode, preferably closer to the cathode, has the advantageous effect of using the electroosmotic water conveyance also for obtaining drinking or sweet water in regions of the soil where impure water, for example salt or brakish water, is present.

FIG. 4 shows installation 58 used to desalinate soil 1, particularly zone of vegetation 2. For this purpose, electrode 61 constituted by net 60 is arranged in zone of vegetation 2 between root ends 59 and soil surface 3. Further electrode 62 also constituted by a net 60 is arranged below root ends 59. Heavy metals 63 and salts 64 are present in the zone of vegetation, as has been schematically indicated. This happens very frequently, particularly in edge or center strip regions of heavily travelled roads because of salt spreading or the precipitation from car exhaust gases. Now, if electrode 62 is connected to a positive potential and electrode 61 to a negative potential of energy source 29, for example battery 65, electrophoresis and electrolysis results. Therefore, the positive metal ions, i.e. cations 66, as for example $K^+$, $Cu^{2+}$, $Pb^{2+}$, $Na^+$, $Na^+$ and $Ca^{2+}$, travel to electrode 61 connected to the negative potential and are deposited, as has been schematically indicated, on net 60 constituting this electrode 61.

However, the negatively charged salt residue, i.e. anions 67 and the hydroxide anions, as for example $Cl^-$, $No_3^-$, $Po_43^-$, $So_42^-$, $HCO_3^-$, $Coo^-$, $OH^-$ and $CH_3^-$, travel in the direction of lower ground region 13 to electrode 62 connected to the positive potential and are precipitated there.

After a short time, this region of the soil is desalinated by the intensive electrical field generated between the two electrodes 61, 62 because the salts travel to the lower layers of soil. Simultaneously, the heavy metals are precipitated on electrode 61 and are deposited there if net 60 is suitably constructed so that they can no longer go into solution.

In connection with this procedure, electrode 68 may be arranged in lower aquifer zone 14 and connected to a positive potential—as indicated by dash-dotted lines—to improve the plants or for new plant growth. The two electrodes 61, 62 are connected to a negative potential and both serve as electrodes. Preferably, the two nets 60 of electrodes 61 and 62, as has also been indicated by broken lines, are connected by connecting line 69 so that they are connected to the same potential. This avoids any electrochemical contamination by pH-value differences in the region of the two electrodes 61 and 62.

After electrode 68 has been connected and the contacting of aquifer zone 14 as anode 70, anions 67 originally precipitated in the region of electrode 62, that is, the "salt residues", travel further in the direction of lower soil layers 15 and are deposited in the region of the aquifer zone. In this manner, they are completely removed from the zone of vegetation. At the same time, an enhanced water flow in the direction of root ends 59 occurs in the use of this installation so that accelerated plant growth is observed and new plants can develop positively after a short time after zone of vegetation 2 has been improved.

In this embodiment of the invention, the cathode is arranged in the region of the roots and another electrode selectively constituting an anode or a cathode is arranged in a lower region of the soil closely adjacent the ends of the roots between the cathode and the anode in the deeper zone of the soil. If the other electrode is an anode, the negatively charged salt residues are conducted from the zone of vegetation to the region below the roots. The metal ions are deposited on the cathode in the region of the roots. Because of the intensive field generation in the zone of the vegetation, the salt removal is effected very rapidly so that a thorough soil improvement is obtained in a short time, which facilitates new plantings or rehabilitates existing plants. When the two electrodes arranged in the range of the roots are connected and used as cathodes, the salts originally deposited under the roots migrate into the range of the anode which is positioned lower so that these salt residues can have no damaging effect on the new plant growth as the roots develop further. Therefore, this installation can be used advantageously for rehabilitating dry land, for planting in dry soil containing large amounts of salt, for rehabilitating portions of land along the edges of roads, and for removing stray salts stored in the soil.

Figure 5:
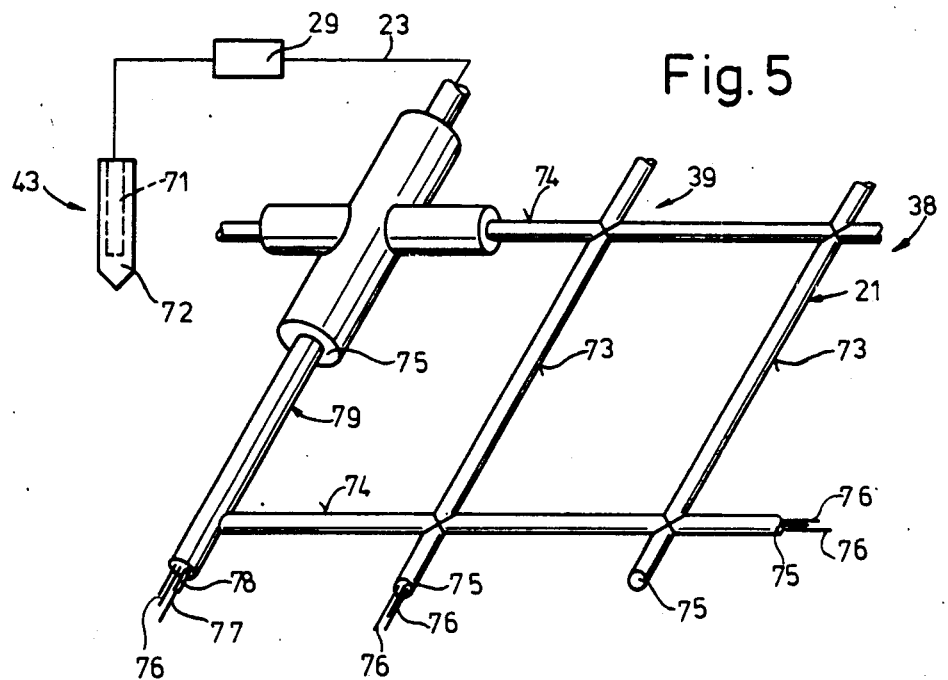
FIG. 5 is a fragmentary perspective view of a net electrode according to the invention.

FIG. 5 shows the net cathode used in the present invention in detail. It is illustrated in connection with cathode 38 which has the form of net 39 connected by conductor system 23 through energy source 29 to an anode constituted by metal rod 71 surrounded by electrically conductive synthetic resin 72. Alternatively, as in the embodiment illustrated in FIG. 2, cathode 38 may be connected to electrode 43.

Net 39 consists of individual threads 73, 74 comprised, as shown in FIG. 5, of one or more core materials embedded in an electrically conductive synthetic resin having a macromolecular structure of the type of a duroplast and consisting, for example, of an at least partially cross-linked acrylate polymer. The core materials are selected from the group consisting of polyamide, acrylic resin, polyester, filaments 76 of carbon or filaments 77 of metal, which preferably has silver coating 78, and they are embedded in conductive synthetic resin 75 and in conductive synthetic resin 46. To increase the conductivity in current supply line 79, which connects net 39 with conductor system 23, carbon and metal filaments 76, 77 are embedded in polyamide, acrylic resin or polyester to form the core material and this is embedded in a conductive synthetic resin 75, as has been schematically indicated in a portion of net 39. With this structure of net 39, a mechanically strong structural body having a high conductivity over a large area is created, which cannot be damaged or destroyed by cultivating machines when it is inserted into regions or vegetation and other soil layers.

Figure 6:
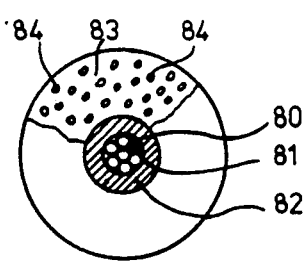
FIG. 6 is an end view, partly in section, of a distribution line of the net electrode.

FIG. 6 shows a thread of the net cathode composed of conductor 80 of metal 81 or carbon filaments which may consist of a plurality of individual wires. This conductor 80 is surrounded by silver coating 82 and is embedded in conductive synthetic resin 83 of the type of a duroplast of macromolecular structure, for example an at least partially cross-linked acrylate polymer, filled with conductive particles 84.

The conductive synthetic resins 72, 75 or 83 contain synthetic resin dispersions, synthetic resin solutions or synthetic resins with metal or metalloid compounds or their solutions in such an amount that there is approximately one metal or metalloid atom per synthetic resin molecule, and which contain metal or metalloid atoms after mixing and the addition of a slight excess of reducing agents or a conventional thermal decomposition, and wherein formed or still present ions are leached out and the dispersions, solutions or granulates reacted with graphite or carbon black are further worked. In the use of such synthetic resins, it is surprising that they are substantially more resistant to mechanical and thermal loads since the conductivity is independent of the conductive particles 84 which are freely floating and embedded in the synthetic resin—as schematically shown over a portion of synthetic resin 83—, i.e. the conductive connection in the synthetic resin is not obtained by conductive particles 84 but by the adhesion of the silver ions in the cavities of the large synthetic resin molecules, the synthetic resin assuming the characteristics of a semi-conductor because of the reduction of the silver ions. Because of this, it is possible to use only an amount of 40%, based on the synthetic resin, of graphite powder to adjust the conductive synthetic resin in its properties to the field of application in distribution lines constituted by the threads of the nets according to the invention.

The details of such a synthetic resin are described in Austrian patent No. 313,588.

Such synthetic resins are not only resistant to chemical and electrochemical influences but also show a high constancy during aging because they contain no ions and, therefore, hardly change under the influence of electric currents.

The cathode net constituted by a group of several, substantially parallel and closely adjacent distribution lines consisting of threads of the indicated composition serve to generate a homogenous electrical field over a large area and, because of the size of the electrical field, the roots or the microorganisms in the soil are not damaged or destroyed even at a high current intensity. At the same time, the use of conductive synthetic resins for embedding the core materials of the distribution lines produces a chemically and biologically highly resistant cathode. This cathode cannot be corroded either by chemicals dissolved in the soil or by electrolytical decomposition since the macromolecular structure of the synthetic resin prevents a corrosion of embedded metallic parts because of the negligibly small potential difference with noble metals, such as silver and the like, even when exposed to diffusion of such chemically corrosive substances. Most of all, the synthetic resin is highly elastic and does not become brittle so that a long, trouble-free operating life of such electrodes is obtained.

The use of nets as electrodes has many advantages in connection with an installation according to the invention. Thus, a net makes the generation of a field of large area possible without disturbing the vegetation, particularly the formation of roots, since they can grow through the net. At the same time, the nutrient and the moisture flow is facilitated since this exchange may proceed through the net and a large surface is provided on which harmful metal ions or, when the electrode is used as anode, salts may be deposited. Furthermore, such a net-like electrode is characterized by high mechanical strength and, when one thread breaks, the net-like connection of the individual threads prevents the electrical field from being interrupted and such a breakage point is automatically bridged. This is particularly important when such electrodes are used in the zone of vegetation because the superimposed layers of soil or regions of the plants are often worked by machines and the field generation is maintained even under these conditions. It is advantageous to embed highly conductive core material in the net threads as current supply conductor so that the outside energy is fully conducted into the net. A corrosion of any metallic core is prevented by the synthetic resin even when chemically corrosive substances penetrate because of the small electrochemical potential difference between the synthetic resin of the net or the synthetic resin coating and the embedded, silver-coated threads. At the same time, the use of silver provides a noble upper electrode which assures the continued functioning of the installation even during passive operation and, most of all, during active operation when the supply of the outside voltage is interrupted.

According to the invention, it is also possible for the conductive synthetic resin which surrounds the core of the threads to contain synthetic resin dispersions, synthetic resin solutions or synthetic resins with metal or metalloid compounds and solutions thereof in such an amount that the ratio of synthetic resin molecules to metal or metalloid atom is approximately 1:1, the synthetic resin containing metal or metalloid atoms after mixing and the addition of reducing agents added in a small excess, or conventional thermal decomposition, and any formed or still present ions being washed out and the dispersions, solutions or granulates being reacted with graphite or carbon black before being worked further, graphite powder in an amount of 40%, based on the synthetic resin, being preferably added to the conductive synthetic resin. Through the use of carbon additives in the conductive synthetic resin, this electrode has a negative polarity, i.e., it is a cathode, regardless of whether or not outside energy is supplied thereto, this effect being further enhanced if the anode consists of a material of a lower valency than that of the electrode in a passive operation. In this manner, it is possible to operate the installation, for example, during the larger water need of plants by supplying outside energy from solar cells during the effective duration of the energy of the sun while the installation may continue to be passively operated without interruption and without the supply of outside energy during the night hours when the use of water is smaller.

It is also advantageous if the surface of the net or the distribution lines provides adhesion and surface roughness so that metal ions adhere thereto because the metal ions are thus directly removed from the soil and cannot be washed into the soil by stronger water movements.

It is of further advantage if the mesh size of the net is adapted to the density of the roots or the thickness thereof, and to use a net with a larger mesh size with larger plants, such as bushes and trees. In this manner, it is possible to adapt the electrode universally to different prevailing conditions and to assure a fully effective operation.

If a source of energy, for example a solar energy cell, and/or an energy storage element, for example a battery, is arranged in the conductor system between the cathode and the anode, the installation may be operated with the supply of outside energy without the arrangement of an additional energy generator by using the prevailing energy of the sun which is usually available in ample measure in regions where watering is necessary, it being possible to operate the installation passively in times of little need for liquid, for example during the night, or in a floating battery operation with an outside voltage by connecting an energy storage element, for example a battery.

The use of an electrode with high conductivity and low transition resistance makes it possible to contact the entire soil layer in a moist soil layer through the moisture to generate the electrical field.

When the net cathode is used in regions with ground or sea water and intermediate water-permeable soil zones, for example sediment layers, it is laid in or above the sediment layers with drainage pipes, which may be coated with conductive synthetic resin, disposed therebelow and is connected to a positive electrode with an aquifer region of the soil as anode. The brakish water usually present in such areas is cleaned while it rises through the different layers of soil but primarily because of the electrophoresis occurring because of the electrical field when the electrodes are activated, i.e. it is freed of harmful dirt particles, primarily salts, so that the water recovered in the drainage pipes may be used as drinking water. When coated drainage pipes are used as electrode, this method may be used very economically since the pipes, which are required anyhow, are inserted at the same time as the necessary electrodes.

What I claim is:

1. An installation for generating an electrical field of a large area in soil having a vegetation zone between the ends of roots of plants in the soil and the surface of the soil, which comprises at least one cathode having a high conductivity and a low transition resistance arranged in the vegetation zone, each one of the cathodes being a flexible net comprised of threads defining meshes of a sufficient size to accommodate the plants therein, the threads of the net being comprised of a core material selected from the group consisting of polyamide, acrylic resin and polyester, containing carbon or metal filaments embedded in an electrically conductive synthetic resin, an anode arranged in a deeper zone of the soil at a greater distance from the soil surface than each one of the cathodes, and an electrical conductor system connecting each one of the cathodes to the anode to enable an electric current to flow therebetween.

2. The installation of claim 1, wherein the anode is comprised of a metal rod coated with a conductive synthetic resin.

3. The installation of claim 1, wherein the surface of the threads of the net has a roughness sufficient to allow metal ions to adhere thereto.

4. The installation of claim 1, comprising a group of said cathodes arranged parallel to each other in the vegetation zone.

5. The installation of claim 1, comprising a group of said cathodes arranged in superposed relationship.

6. The installation of claim 1, comprising an additional one of said cathodes, the additional cathode being arranged in superposed relationship above the vegetation zone.

7. The installation of claim 1, wherein the synthetic resin has the characteristics of a semi-conductor.

8. The installation of claim 1, wherein the deeper zone is an aquifer zone, and further comprising a water-permeable zone intermediate the aquifer and the vegetation zones, and drainage pipes disposed in the water-permeable zone.

9. The installation of claim 8, wherein the drainage pipes are coated with a conductive synthetic resin.

10. The installation of claim 1, further comprising drainage pipes arranged below the cathode between the cathode and the anode.

11. The installation of claim 10, wherein the drainage pipes are arranged closer to the cathode than to the anode.

12. The installation of claim 1, wherein the conductive synthetic resin is a macromolecular duroplast.

13. The installation of claim 12, wherein the macromolecular duroplast is an at least partially cross-linked polyacrylate.

14. The installation of claim 1, further comprising a source of electrical energy in the conductor system.

15. The installation of claim 14, wherein the electrical energy source has a voltage output of 6 volt and a current output of about 50 mA.

16. The installation of claim 1, wherein the carbon or metal filaments are silver-coated.

* * * * *